(12) United States Patent
Mörschner et al.

(10) Patent No.: US 7,128,807 B2
(45) Date of Patent: Oct. 31, 2006

(54) DEVICE FOR THE ULTRASONIC SEALING AND SEPARATION OF A PIPE SECTION

(75) Inventors: Rolf Mörschner, Wiesbaden (DE); Udo Wagenbach, Buseck (DE)

(73) Assignee: Stapla Ultraschall-Technik GmbH, Kelsterbach (DE)

( * ) Notice: Subject to any disclaimer, the term of this patent is extended or adjusted under 35 U.S.C. 154(b) by 0 days.

(21) Appl. No.: 10/505,889

(22) PCT Filed: Mar. 7, 2003

(86) PCT No.: PCT/EP03/02374

§ 371 (c)(1),
(2), (4) Date: Nov. 23, 2004

(87) PCT Pub. No.: WO03/076116

PCT Pub. Date: Sep. 18, 2003

(65) Prior Publication Data

US 2005/0167054 A1  Aug. 4, 2005

(30) Foreign Application Priority Data

Mar. 8, 2002 (DE) ................. 102 10 075

(51) Int. Cl.
*B32B 37/00* (2006.01)
(52) U.S. Cl. ................. 156/580.2; 156/580.1
(58) Field of Classification Search ............... 156/73.1, 156/580.1, 580.2; 264/442, 443, 444; 425/174.2; 228/110.1, 1.1
See application file for complete search history.

(56) References Cited

U.S. PATENT DOCUMENTS 3,681,176 A  8/1972  Reifenhauser
3,976,240 A  8/1976  Matrisian
4,025,374 A  5/1977  Spindler et al.
4,517,790 A  5/1985  Kreager
5,265,508 A  11/1993  Bell et al.
5,843,256 A  12/1998  Han
5,985,065 A  11/1999  Kling

FOREIGN PATENT DOCUMENTS

DE  1479511  7/1969
FR  2076164  10/1971

*Primary Examiner*—James Sells
(74) *Attorney, Agent, or Firm*—Dennison, Schultz & MacDonald

(57) ABSTRACT

A device for the fluid-tight sealing and separation of a pipe section by means of an ultrasonic welding device, including a sonotrode with a first welding surface, an anvil with a second welding surface that is assigned to the first welding surface, and a separating element which starts from the sonotrode and extends past the first welding surface. In order to be able to separate a section of a pipe in such a way that the pipe is sealed in a fluid-tight manner regardless of the side on which the section is located and without having to change tools or reposition the ultrasonic welding device, the sonotrode is provided with two first welding surfaces which are placed at a distance from each other and to which two second welding surfaces of the anvil are assigned, the separating element is disposed between the two first welding surfaces, and a recess which is located between the two second welding surfaces of the anvil is assigned to the separating element.

11 Claims, 3 Drawing Sheets

DEVICE FOR THE ULTRASONIC SEALING AND SEPARATION OF A PIPE SECTION

Figure 1:
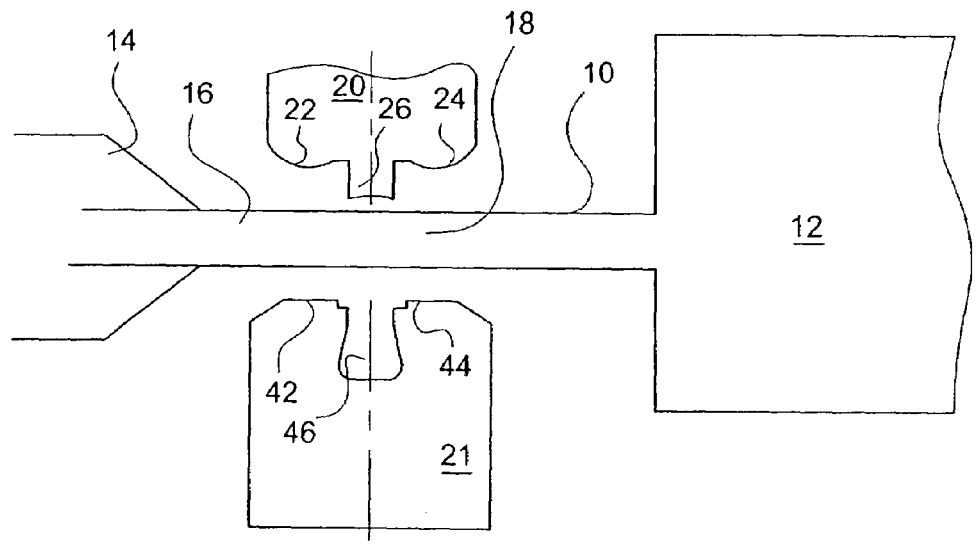
Figure 1:
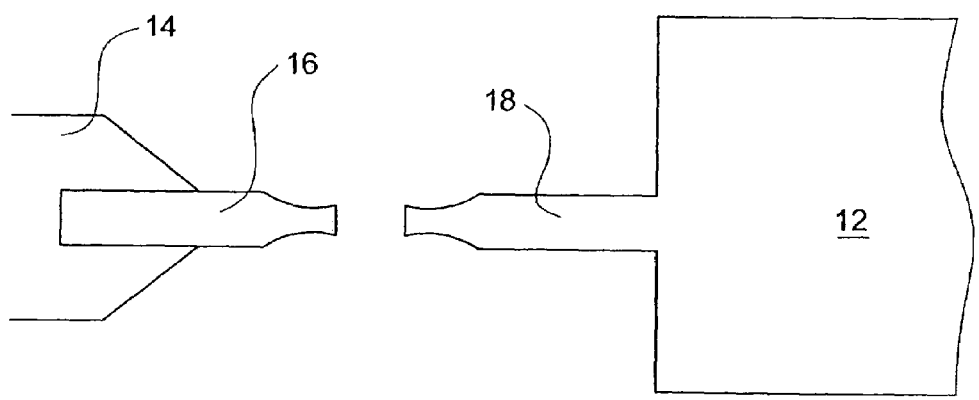

The invention relates to a device for the fluid-tight sealing and separation of a pipe section by means of an ultrasonic welding device, comprising a sonotrode with a first welding surface and a counter-electrode with a second welding surface assigned to the first welding surface as well as a separating element extending from the sonotrode and projecting past the first welding surface.

In devices and equipment used for measuring or cooling technology, pipes are used, which are first evacuated and then filled with a cooling gas. For this purpose pipes are connected to a coupling. After filling them, the coupling-side section of the tube must be separated. To do so it is necessary to seal the pipe leading to the equipment or device, such as a refrigerator or air conditioner, in a fluid-tight manner.

Pursuant to the state of the art, squeezing and brazing are known techniques. An adhesion technique is also being used, in which the filled pipe is closed with a cap, which in turn is glued to the pipe.

If fluid-tight sealing by means of brazing is performed, it has the disadvantage that when the pipe was not previously squeezed in a sealing fashion, a shaft forms in the applied brazing material, which is penetrated by gas exiting from the pipe, thus causing a leak. Regardless thereof, a corresponding technique can be employed only with CFC fluids since they are not combustible.

Today CFC has largely been replaced with isobutane, which is, however, highly explosive. Hence brazing is no longer possible. For this reason ultrasonic welding has gained a foothold, enabling squeezing and fluid-tight sealing of the pipe, which is initially evacuated and then filled with a cooling gas, actions to be performed in a single operation.

In the familiar ultrasonic welding devices used for the fluid-tight sealing of pipes, sonotrodes are used comprising a first welding surface, adjacent to which a separating element runs. Accordingly, the assigned counter-electrode—also called an anvil—comprises a second welding surface that is assigned to the first welding surface, adjacent to which a counter-element runs; this can be an edge that is assigned to the separating element.

As a function of whether the so-called "right" or "left" end of a pipe leads to the coupling, different tools are required. From a purely theoretical point of view it would also be feasible to use one tool, if the ultrasonic welding device were repositioned accordingly; a possibility, which, however, for practical reasons cannot be considered.

It is the object of the present invention to further design a device of the aforementioned kind such that a section of a pipe can be separated without changing tools or repositioning the ultrasonic welding device such that the pipe is sealed in a fluid-tight fashion, regardless of the fact on what side the section runs.

Pursuant to the invention, the object is essentially achieved in that the sonotrode comprises two spaced first welding surfaces, to which two second welding surfaces of the counter-electrode are assigned, and in that between the two first welding surfaces the separating element is arranged, to which a notch between the two second welding surfaces of the counter-electrode is assigned.

Pursuant to the invention the tools of the ultrasonic welding device are further developed such that the pipe is sealed in a fluid-tight fashion through two spaced areas, whereupon the pipe is then separated between the sealed areas. It is therefore irrelevant on what side a pipe section leading to a connection such as a coupling must be separated. Of course the area that is being separated can likewise be welded during the ultrasonic operation.

The notch in the counter-electrode or in the anvil is in particular a channel-shaped notch, preferably penetrating the end faces of the counter-electrode, such as a longitudinal recess, wherein its area on the opening side should be narrower than the bottom area, i.e. have a lesser width than the bottom area. This results in the advantage that material developing during separation is collected in the recess so that an ongoing machining process or subsequent processes are not impaired. Additionally the edge on the opening side of the recess should be designed to have sharp edges in order to facilitate the separation of the pipe from the section leading to a connection such as the coupling.

The notch in its cross-section in particular has a rectangular outer section on the opening side and a trapezoidal inner section. Additionally, a well or depression may be provided in the bottom area of the notch in order to collect material in a specific location.

With respect to the separating element it should be noted that its width is smaller than the width of the longitudinal notch extending on the opening side. The separating element furthermore has a substantially cuboid geometry, the outer surface of which facing the counter-electrode has a concave design so that longitudinal cutting edges develop.

Furthermore the first welding surfaces should each have a convex surface, which transition on the separating element side into inner sections extending in a common plane, said sections in turn extending parallel or substantially parallel to the outer surface of the separating element or the plane formed by it.

Further details, benefits and features of the invention result not only from the claims, the features revealed therein—either alone and/or in combination with each other—, but also from the following description of a preferred embodiment illustrated in the drawing.

Figure 2:
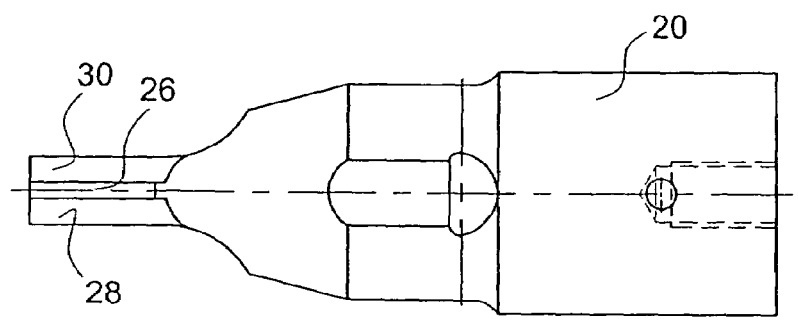
Figure 3:
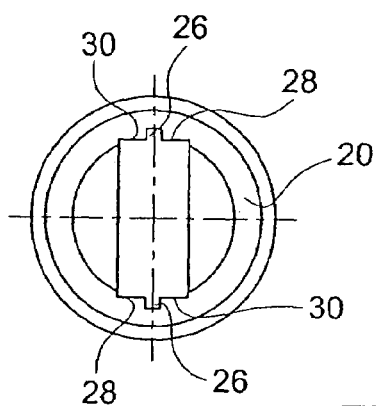
Figure 4:
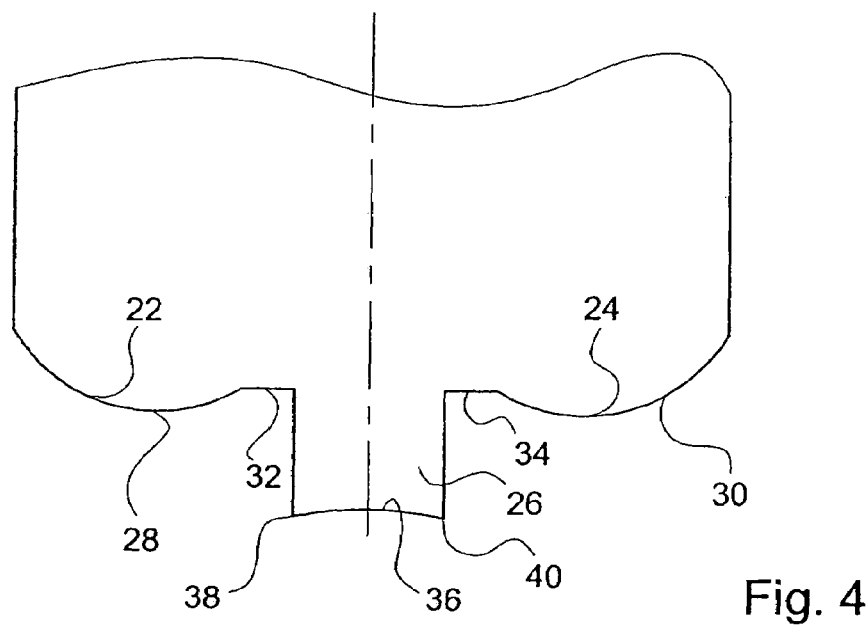
Figure 5:
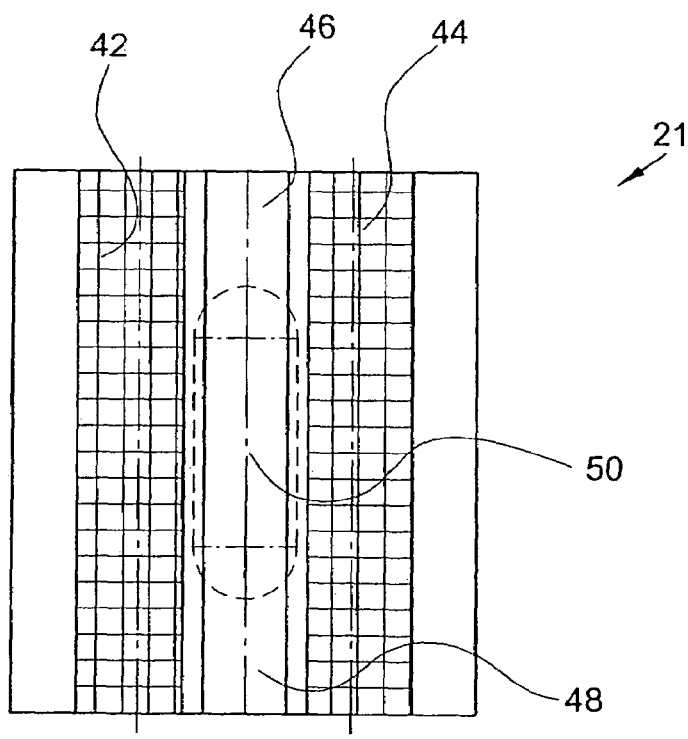

The drawing shows:

FIG. 1 a basic illustration of the ultrasonic welding device pursuant to the invention to explain its operating principle, FIG. 2 a top view onto a sonotrode of the ultrasonic welding device from FIG. 1, FIG. 3 a front view of the sonotrode from FIG. 2, FIG. 4 the sonotrode pursuant to FIG. 3 in an enlarged illustration and in a sectional view, FIG. 5 a top view onto a counter-electrode that is assigned to the sonotrode pursuant to FIG. 2 to 4, and FIG. 6 a section through the counter-electrode from FIG. 5.

Pipes that are required e.g. for thermo-sensors, air conditioners or refrigerators must first be evacuated and then be filled with a cooling gas. Subsequently it is necessary to hermetically seal the pipe. To do so, pursuant to FIG. 1 a corresponding pipe 10 e.g. of a compressor 12—without hereby limiting the invention—is connected by means of a coupling 14 to an evacuating or gas-filling device. After evacuating the pipe 10 and filling it with cooling gas, the pipe 10 must be sealed on its ends in a fluid-tight fashion. At the same time, the section 16 leading to the coupling 14 must be separated.

Although pursuant to the embodiment from FIG. 1 the pipe 10 projects to the left from the compressor 12, it is also possible that it projects to the right from the compressor or any other device of the measuring or cooling system. However, in order to enable safe sealing and/or closing and separating of the pipe 10 from the section 18 leading to the compressor 12 or a corresponding device regardless of the position of the pipe 10 in relation to the coupling 14 or any other connection, the sonotrode 20 and counter-electrode or anvil 21 in an ultrasonic welding device are designed such that two sealed welding areas are created, between which the pipe 10 is separated, i.e. the sections and 18 are separated from each other. At the same time this results in the advantage that the pipe section 16 leading to the coupling 14 is likewise sealed in a fluid-tight fashion on the outside, so that based on the excess pressure prevailing in the coupling 14 gas cannot flow to the outside through the pipe section 16.

In order to form the desired two spaced sealing areas, the sonotrode 20 comprises two spaced welding surfaces 22, 24, between which a separating element 26 runs. The welding surfaces 22, 24 consist of outer convex areas 28, 30, whic transition into straight inner areas 32, 43 extending in a common plane and adjoining the separating element 26. The areas 32, 34 according to the embodiment extend perpendicular to the vertical axis of the sonotrode 20.

The separating element 26 itself has a rectangular profile, i.e. a cuboid geometry, wherein the outer surface 36 facing-the anvil 21 has a concave design. This results in blade-like longitudinal or cutting edges 38, 40 in the periphery of the separating element 26.

According to the sectional view the sonotrode 20 or its head has a symmetrical design, comprises two separating elements 26 and accordingly adjoining welding surfaces 28, 30, 32, 34.

The counter-electrode or the anvil 21 that is assigned to the sonotrode 20 or its head has a cuboid profile with two second welding surfaces 42, 44 extending on top, wherein said surfaces can contain familiar structuring such as cross-fluting.

Between the two second welding surfaces 42, 44 in the embodiment a channel-like longitudinal notch 46 extends, which penetrates the anvil 21 in its end face. The longitudinal notch 46 has a lesser width on the opening side than on the bottom. Moreover a depression or well 50 can be provided in the bottom 48 in order to collect or receive material developing during the separation process.

Additionally the longitudinal notch 46 should have sharp edges in terms of its longitudinal edges or borders 52, 54 so as to ensure that the desired amount of pipe material is sheared, which is supposed to be removed between the areas of the pipe 10 sealed by welding and drops into the bottom area of the longitudinal notch 46.

Figure 6:
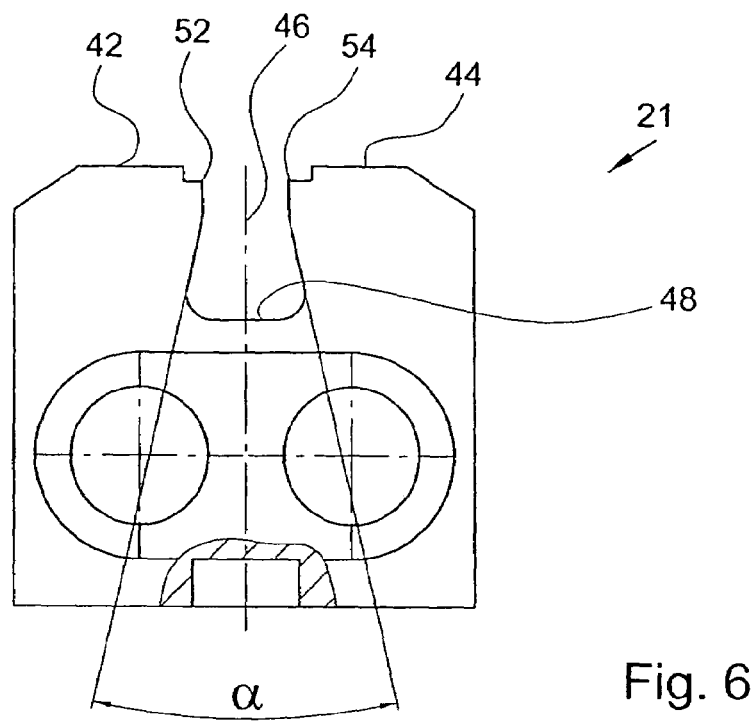

The section view pursuant to FIG. 6 shows that the notch 46 is composed in its cross-section of a rectangular section extending on the opening side and a trapezoidal section leading to the bottom 48, the side wall of which can enclose an angle α, wherein $10°\leqq\alpha\leqq10°$.

If it is preferred that the notch 46 that is assigned to the separating element 26 is designed as a longitudinal recess in the anvil 21, other geometries are likewise conceivable. In particular it is not required that the notch penetrate the anvil 21 in its end face. It is also possible that the notch transitions into an opening that penetrates the anvil 21 and extends perpendicular to the second welding surfaces 42, 44, wherein the pipe material developing during the separation process can be removed via said opening.

The invention claimed is:

1. Device for the fluid-tight sealing and separation of a pipe section (10, 16, 18) by means of an ultrasonic welding device, comprising:
   a sonotrode (20) with two spaced first welding surfaces (22, 24),
   a counter-electrode or an anvil (21) with two second welding surfaces (42, 44) assigned to the two first welding surfaces,
   a separating element (26) extending from the sonotrode between the two first welding surfaces,
   a notch (46) between the two second welding surfaces of the counter-electrode which is assigned to said separating element (26), said notch having an opening with a first cross-sectional area; said notch having a bottom area with a second cross-sectional area; wherein the first cross-sectional area of the opening of the notch is less than the second cross-sectional area of the bottom area of the notch.

2. Device pursuant to claim 1, wherein the notch (46) is a channel-shaped longitudinal recess penetrating the end faces of the counter-electrode (21).

3. Device pursuant to claim 1, wherein the notch has sharp edges on the opening side area.

4. Device pursuant to claim 1, wherein the notch (46) in its cross-section has a rectangular outer section extending on the opening side and a trapezoidal inner section.

5. Device pursuant to claim 1, wherein notch (46) further comprises a bottom area (48) comprising a recess (50).

6. Device pursuant to claim 1, wherein the width of the separating element (26) is less than the width of the notch (46) extending on the opening side.

7. Device pursuant to claim 1, wherein the separating element (26) further comprises an outer concave surface (36) extending on the counter-electrode side.

8. Device pursuant to claim 1, wherein each of the first welding surfaces (22, 24) has a convex surface.

9. Device pursuant to claim 7 or 8, wherein the convex surfaces (22, 24) on the separating element side transition into an inner section (32, 34) extending in a common plane, wherein the plane runs parallel or substantially parallel to the outer surface (36).

10. Device pursuant to claim 1, wherein the separating element (26) further comprises longitudinal and sharp edges (38, 40).

11. Device pursuant to claim 1, wherein the separating element (26) has a rectangular profile.

* * * * *